United States Patent [19]

Ader

[11] Patent Number: 4,631,855
[45] Date of Patent: Dec. 30, 1986

[54] MULTI-PURPOSE FISHERMAN'S DEVICE

[75] Inventor: Gary B. Ader, Spirit Lake, Iowa

[73] Assignee: Berkley and Company, Inc., Spirit Lake, Iowa

[21] Appl. No.: 758,659

[22] Filed: Jul. 24, 1985

[51] Int. Cl.$^4$ ............................................. A01K 97/00
[52] U.S. Cl. ....................................... 43/53.5; 81/311; 7/106
[58] Field of Search ............... 43/53.5; 7/106, 107, 7/125, 132, 133, 134; 81/303, 304, 305, 306, 311

[56] References Cited

U.S. PATENT DOCUMENTS

| | | | |
|---|---|---|---|
| 345,826 | 1/1886 | Beales | 7/134 |
| 574,178 | 12/1896 | Stebbins | 43/53.5 |
| 2,063,167 | 12/1936 | Kamborian | 81/311 |
| 2,608,891 | 9/1952 | Haussler | 81/311 |
| 3,675,359 | 7/1972 | Ohno | 43/53.5 |
| 3,965,719 | 6/1976 | Hays | 7/134 |

FOREIGN PATENT DOCUMENTS

| | | | |
|---|---|---|---|
| 241659 | 12/1911 | Fed. Rep. of Germany | 7/125 |
| 2444440 | 8/1980 | France | 7/125 |

Primary Examiner—Nicholas P. Godici
Assistant Examiner—Kurt Rowan
Attorney, Agent, or Firm—Faegre & Benson

[57] ABSTRACT

The present invention is a multi-purpose device for use by fishermen. A first lever arm includes a handle, a primary jaw element and a secondary jaw element. A second lever arm includes a handle and a primary jaw element. The second lever arm is pivotally connected to the first lever arm so that the primary jaw elements form a pair of primary jaws for gripping, crimping or cutting. A jaw member includes a flange and a secondary jaw element. The jaw member is pivotally connected to the first lever arm in proximity to the secondary jaw element so that the secondary jaw elements form a pair of secondary jaws for gripping hooks embedded in the gullet of a fish. A connecting link is pivotally connected between the second lever arm and the jaw member, so that the primary and secondary jaws simultaneously open and close in response to pivotal movement of the handles relative to each other.

11 Claims, 5 Drawing Figures

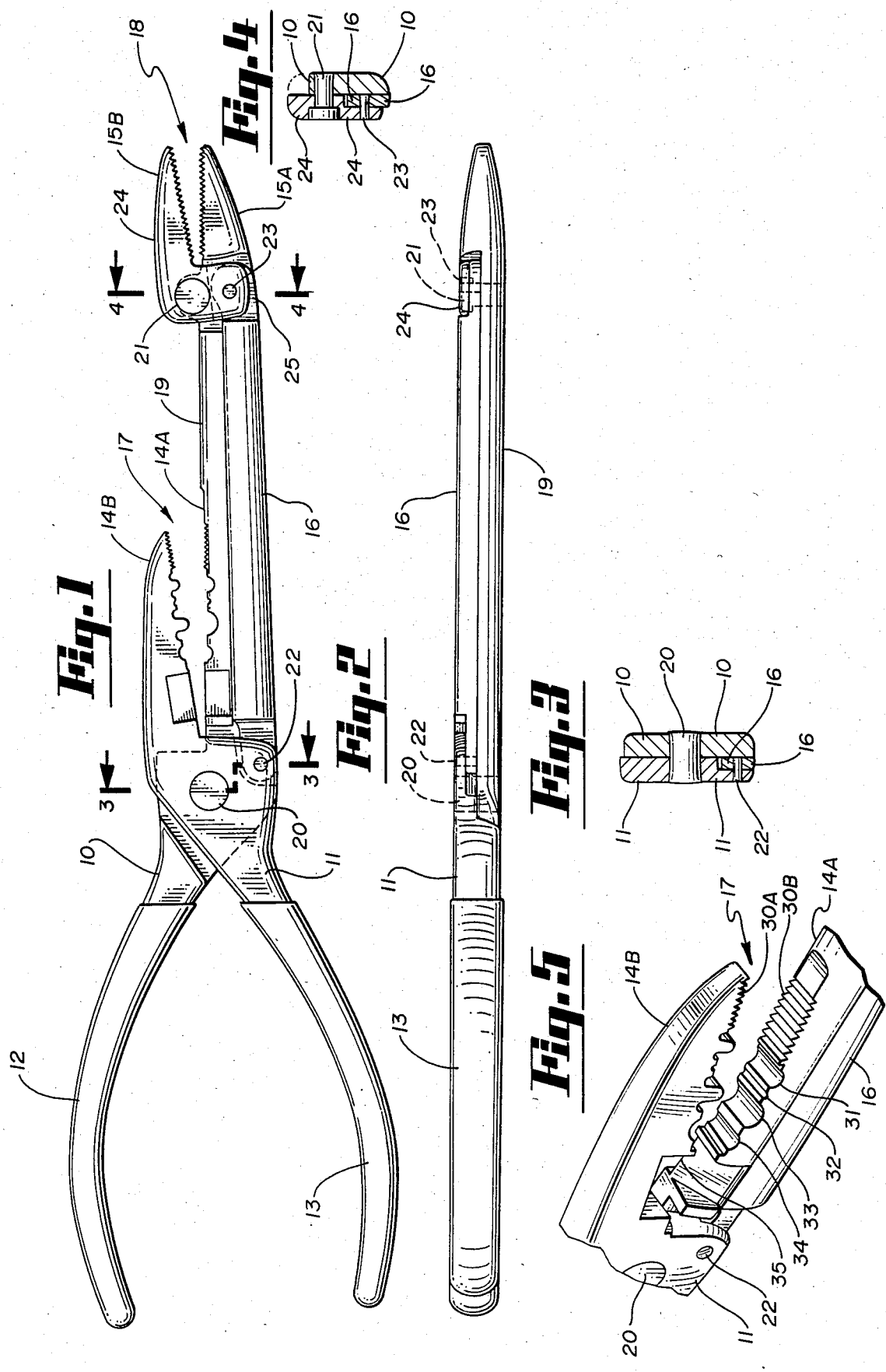

4,631,855

1

MULTI-PURPOSE FISHERMAN'S DEVICE

BACKGROUND OF THE INVENTION

1. Field of the Invention

The present invention relates to a multi-purpose device for fishermen. In particular the present invention relates to pliers having two sets of jaws, one such set capable of insertion into the mouths of fish to remove fishing hooks.

2. Description of the Prior Art

Fishing hooks embedded deep into the gullet of a fish present a problem for removal. Conventional pliers do not always extend far enough into a fish to reach the hook.

A device for removal of fish hooks is shown in Stader U.S. Pat. No. 2,836,004. The device includes an elongated shank and a jaw which is inserted into the mouth of a fish. A trigger actuates a movable jaw element to grasp the hook. Once the hook is freed from the gullet of a fish, the movable and hollow jaw elements clamp over the hook during removal. The Stader device is limited in use to removal of fishing hooks.

A fisherman has several occasions to cut fishing line, reshape bent hooks and lures, apply weights and sinkers, and perform various other tasks when fishing or preparing tackle. Performing these chores requires several different hand tools, such as cutters, crimpers, pliers, etc. However, none of these tools are also satisfactory for removal of fishing hooks embedded deep into the gullet of a fish.

SUMMARY OF THE INVENTION

The present invention contemplates a tool capable of several functions associated with fishing. The present device comprises pliers with two sets of jaws: primary jaws and secondary jaws. The two sets of jaws are connected by a link so that the jaws open and close in unison. The primary jaws are capable of grasping small items, cutting fishing line, bending hooks, and other uses. The secondary jaws are capable of insertion into the mouth of a fish for gripping and removing hooks. Hook removal is performed without damage to either the fish carcass or the hook. Thus, the present invention teaches a multi-purpose device, allowing the fisherman to carry one tool in place of several.

BRIEF DESCRIPTION OF THE DRAWINGS

FIG. 1 is an elevational view of the device of the present invention, showing the primary jaws and the secondary jaws in the open position.

FIG. 2 is a bottom plan view of the device shown in FIG. 1.

FIG. 3 is a sectional view taken on line 3—3 of FIG. 1.

FIG. 4 is a sectional view taken at line 4—4 of FIG. 1.

FIG. 5 is an exploded perspective view of the primary jaws of the device shown in FIG. 1.

DETAILED DESCRIPTION OF THE PREFERRED EMBODIMENTS

The multi-purpose fisherman's device of the present invention is generally depicted in FIG. 1. A first lever arm 10 terminates at one end in a handle 12 and in an elongated jaw portion 19 at the other end. Jaw portion 19 includes a secondary base jaw element 15A at the end of lever arm 10 opposite handle 12, with a primary base jaw element 14A located therebetween. Primary base jaw element 14A and secondary base jaw element 15A lie substantially in the same plane.

A second lever arm 11 is pivotally connected to first lever arm 10 by means of a first fulcrum 20. Lever arm 11 terminates at one end in a handle 13 and in a primary upper jaw element 14B at the other end. Primary upper jaw element 14B cooperates with primary base jaw element 14A to define a pair of primary jaws 17. Fulcrum 20 allows pivotal rotation of lever arm 11 about lever arm 10.

A movable jaw member 24 is pivotally mounted to lever arm 10 by means of a second fulcrum 21. Jaw member 24 terminates in a secondary upper jaw element 15B at one end and in a flange 25 at the other end. Secondary upper jaw element 15B cooperates with secondary base jaw element 15A to define a pair of secondary jaws 18 which are in line with primary jaws 17. Fulcrum 21 allows pivotal rotation of jaw member 24 about lever arm 10.

Secondary jaws 18 are adapted for insertion into the mouth of a fish. Work surfaces of secondary upper 15B and base 15A jaw elements are serrated for gripping fishing hooks.

A connecting link 16, flanged at both ends, is positioned in a cut-out in first lever arm 10 beneath jaw portion 19. As shown in FIG. 2, link 16 does not protrude beyond the cut-out area in jaw portion 19. Link 16 is pivotally connected to second lever arm 11 with a first pivot pin 22. Pin 22 is inserted through corresponding apertures in lever arm 11 and a flanged end of link 16, as shown in FIG. 3. Link 16, which fits between lever arms 10 and 11 is connected to lever arm 11 with pin 22. Link 16 slides back and forth along the cut-out of jaw portion 19 upon rotational movement of handle 13.

A second pivot pin 23 connects jaw member 24 with link 16. As FIG. 4 illustrates, a flanged end of link 16 is placed between jaw member 24 and first lever arm 10. Pin 23 is inserted through corresponding apertures in jaw member 24 and a flanged end of link 16.

When assembled, second lever arm 11 is rotated about first fulcrum 10 to open and close primary jaws 17. Handle 13 is moved away from handle 12 to open primary jaws 17. Such rotational movement causes connecting link 16 to slide longitudinally along jaw portion 19 from left to right. The motion of link 16 causes the jaw member 24 to rotate about second fulcrum 24 and open secondary jaws 18. The rotational movement of second lever arm 11 is translated through connecting link 16 to jaw member 24, causing the substantially identical angular displacement in secondary jaws 18 as exists in primary jaws 17. Thus, primary 17 and secondary 18 jaws open and close in unison. The user operates handles 12 and 13 to simultaneously actuate both pairs of jaws 17 and 18.

The preferred embodiment of the multi-use primary jaws 17 is depicted in FIG. 5. Serrated work surfaces 30B and 30A for gripping are provided on both upper 14B and base 14A jaw elements, respectively. Also, registering notches and grooves on upper 14B and base 14A jaw elements cooperate to define a small crimper 31, a small bend vise 32, a large crimper 33, a large bend vise 34 and a cutter 35. Crimpers 31 and 32 can be used by fishermen to apply various weights and connectors. Other arrangements and variations of the jaw elements may be substituted for the present design.

Although the present invention has been described with reference to preferred embodiments, workers skilled in the art will recognize that changes may be made in form and detail without departing from the spirit and scope of the invention.

What is claimed is:

1. A multi-purpose fisherman's device comprising:
   a first lever arm, terminating at one end in a handle and terminating at the other end in an extended secondary base jaw element, and providing a primary base jaw element therebetween,
   a second lever arm, terminating at one end in a handle and terminating at the other end in a primary upper jaw element,
   means for pivotally connecting the second lever arm to the first lever arm in proximity to the primary base jaw element so that the primary upper and base jaw elements cooperate to define primary jaws, operated by movement of the handles of the first and second lever arms relative to each other,
   a movable jaw member, terminating at one end in a flange and terminating at the other end in a secondary upper jaw element,
   a connecting link, pivotally connected between the second lever arm and the jaw member, and
   means for pivotally connecting the jaw member to the first lever arm in proximity to the secondary base jaw element so that the secondary upper and base jaw elements cooperate to define a pair of secondary jaws, operated by movement of the handles of the first and second lever arms relative to each other.

2. A multi-purpose fisherman's device as recited in claim 1 wherein the primary jaws and the secondary jaws simultaneously open and close upon movement of the handles of the first and second lever arms relative to each other.

3. A multi-purpose fisherman's device as recited in claim 1 wherein the means for connecting the jaw member to the first lever arm lies substantially beyond the means for connecting the second lever arm to the first lever arm on a line defined by the primary and secondary base jaw elements.

4. A multi-purpose fisherman's device as recited in claim 1 wherein the surfaces of the secondary upper and base jaw elements are serrated for gripping.

5. A multi-purpose fisherman's device as recited in claim 1 wherein the surface of one of the primary jaw elements contains a plurality of notches and grooves aligned with a plurality of cooperating notches and grooves located on the surface of the other of the primary jaw elements.

6. The invention of claim 5 wherein the cooperating notches and grooves are constructed and arranged for cutting.

7. The invention of claim 5 wherein the cooperating notches and grooves are constructed and arranged for crimping.

8. The invention of claim 5 wherein the cooperating notches and grooves are arranged for gripping.

9. A hand tool comprising:
   a pair of pivotally connected handles;
   a first jaw portion connected to one of the handle portions;
   a second jaw portion connected to the other of the handle portions and having a length extending substantially beyond the length of the first jaw portion;
   a further jaw member pivotally mounted on the second jaw portion beyond the pair of jaws formed with the first jaw portion; and
   connecting link means pivotally connected at one end to the first jaw portion for reciprocating movement along the elongated second jaw portion and pivotally connected at the other end to a projection from the further jaw member for operating the second pair of jaws in synchronism with the first pair of jaws as the handles are pivotally moved relative to each other.

10. A multi-purpose fisherman's device as recited in claim 1 wherein the means for pivotally connecting the second lever arm to the first lever arm includes a first fulcrum.

11. A multi-purpose fisherman's device as recited in claim 1 wherein the means for pivotally connecting the jaw member and the first lever arm includes a second fulcrum.

* * * * *